(12) United States Patent
Dallapiccola et al.

(10) Patent No.: US 12,140,221 B2
(45) Date of Patent: Nov. 12, 2024

(54) LUBRICATION ASSEMBLY WITH A LUBRICANT CONVEYOR

(71) Applicant: DANA ITALIA S.R.L., Trentino (IT)

(72) Inventors: Matteo Dallapiccola, Trento (IT); Pier Paolo Rinaldi, Arco (IT); Michelangelo Marini, Trento (IT)

(73) Assignee: DANA ITALIA S.R.L., Trentino (IT)

( * ) Notice: Subject to any disclaimer, the term of this patent is extended or adjusted under 35 U.S.C. 154(b) by 7 days.

(21) Appl. No.: 17/935,429

(22) Filed: Sep. 26, 2022

(65) Prior Publication Data

US 2024/0102550 A1 Mar. 28, 2024

(51) Int. Cl.
F16H 57/04 (2010.01)

(52) U.S. Cl.
CPC ....... F16H 57/046 (2013.01); F16H 57/0423 (2013.01); F16H 57/045 (2013.01)

(58) Field of Classification Search
CPC ............ F16H 57/0409; F16H 57/0421; F16H 57/0423; F16H 57/046; F16H 57/0457; F16H 57/0458; F01M 1/08
See application file for complete search history.

(56) References Cited

U.S. PATENT DOCUMENTS

| | | | |
|---|---|---|---|
| 1,143,307 A * | 6/1915 | Noyes | F16H 57/0421 184/11.1 |
| 1,714,509 A * | 5/1929 | Kemble | F16H 57/0421 184/13.1 |
| 2,492,267 A * | 12/1949 | Burrows | F16H 57/0421 184/11.1 |
| 3,800,913 A * | 4/1974 | Schmitt | F01M 1/12 74/606 R |
| 4,327,598 A * | 5/1982 | Yoneda | F16H 57/0427 74/467 |
| 5,099,715 A * | 3/1992 | Baiker | F16H 57/0456 184/6.12 |
| 5,709,135 A * | 1/1998 | Baxter | B60K 23/04 475/160 |
| 9,568,091 B2 | 2/2017 | Drill et al. | |
| 9,810,310 B2 * | 11/2017 | McLauchlan | F16H 57/0421 |
| 10,400,883 B2 * | 9/2019 | Valva | F16H 1/14 |
| 11,181,184 B2 | 11/2021 | Base | |
| 2007/0175706 A1 * | 8/2007 | Shilo | F16H 57/0427 184/6.12 |
| 2015/0219206 A1 * | 8/2015 | Trost | F16H 57/0471 475/160 |
| 2016/0091080 A1 * | 3/2016 | Craft | F16H 57/0436 184/6.12 |
| 2018/0058570 A1 * | 3/2018 | Osborn | F16H 57/0435 |
| 2019/0257406 A1 * | 8/2019 | Ichikawa | F16H 57/0452 |
| 2020/0103018 A1 | 4/2020 | Base | |
| 2020/0217222 A1 * | 7/2020 | Guillemont | F01D 25/24 |
| 2020/0325979 A1 | 10/2020 | Gravina et al. | |
| 2022/0252009 A1 * | 8/2022 | Polly | F16H 57/0456 |

* cited by examiner

*Primary Examiner* — Minh Truong
(74) *Attorney, Agent, or Firm* — McCoy Russell LLP (57) ABSTRACT

A lubrication assembly and operating method are provided herein. The lubrication assembly includes a rotating component an axial recess positioned on an axial side of the rotating component, and a lubricant conveyor that remains stationary relative to the rotating component and extends into the axial recess to form a gap between axial recess and the first lubricant conveyor. The lubricant conveyor directs a lubricant toward the axial recess during rotation to generate a lubricant spray focused in a targeted direction.

17 Claims, 6 Drawing Sheets

LUBRICATION ASSEMBLY WITH A LUBRICANT CONVEYOR

TECHNICAL FIELD

The present disclosure relates to a lubrication assembly and more specifically to a lubricant conveyor positioned adjacent to a rotating component.

BACKGROUND AND SUMMARY

Lubrication arrangements are used in mechanical systems to reduce component wear and remove heat from the components. In certain prior lubrication arrangements splash lubrication has been used due to its relative simplicity when compared to move complex lubrication arrangements that use pumps, filters, manifolds, and jets, in some cases. In splash lubrication assemblies, gears or other rotating components are submerged in oil which then flings the oil around an enclosure to haphazardly lubricate other components.

One such splash lubrication arrangement is disclosed in US 2020/0103018 A1 to Base et al. Therein rotation of gears drives splash lubrication that is collected in a catch basin. As lubricant accumulates in the catch basin, lubricant is metered into a brake chamber with friction discs.

The inventors have recognized several drawbacks with previous splash lubrication arrangements in transmissions such as the drive assembly disclosed in Base et al. For instance, submerging gears in oil for splash lubrication decreases system efficiency and system efficiency is often times decreased to achieve a desired amount of component lubrication. As such, in prior splash lubrication systems unwanted tradeoffs are made between component lubrication targets and system efficiency.

The inventors have recognized the aforementioned issues and developed a lubrication assembly to at least partially overcome the challenges. The lubrication assembly includes a rotating component (e.g., a gear, pulley, flywheel, and the like) with an axial recess positioned on an axial side of the rotating component, and a lubricant conveyor that remains stationary relative to the rotating component. The lubricant conveyor extends into the axial recess to form a gap between a surface of the axial recess and an end of the lubricant conveyor. The lubricant conveyor directs a lubricant toward the axial recess to generate a lubricant spray focused in a targeted direction during rotation of the rotating component. In this way, interaction between the lubricant conveyor and the rotating components allows the lubricant to be more precisely delivered to desired components such as other gears, bearings, and the like when compared to prior splash lubrication systems. As a result, the components may avoid degradation and the system's longevity is consequently increased without unduly decreasing system efficiency when compared to previous splash lubrication systems.

Further, in one example, the dynamics of the lubricant spray may be altered based on the speed of the rotating component. For instance, at lower speeds, at least a portion of the lubricant which flows from the conveyor into the gap, adheres to a surface of the axial recess. Next, the lubricant travels tangentially outward along the surface due to the rotation of the component, as releases from the component at a circumferential edge and flows towards desired componentry in the system. At higher speeds, at least a portion of the lubricant in the conveyor reaches the gap and forms droplets in the windage that have an axial as well as tangential component of velocity. These droplets again travel toward intended componentry. In this way, the lubricant flow is more precisely directed in desired directions, thereby increasing lubrication performance of the system, when compared to splash lubrication designs that distribute lubricant in a more random manner.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A lubricant distribution assembly is described herein that effectively generates a lubricant spray in an intended direction which lubricates and cools selected components. The lubrication assembly includes a lubricant conveyor which flows lubricant towards a recess in a rotating component. A gap formed between the conveyor and the recess along with the positioning the conveyor in the component's windage allows a lubricant spray pattern with a tangential velocity component to be generated. This lubricant flow pattern allows for focused distribution of the lubricant over a wide range of rotating component speeds.

Figure 1:
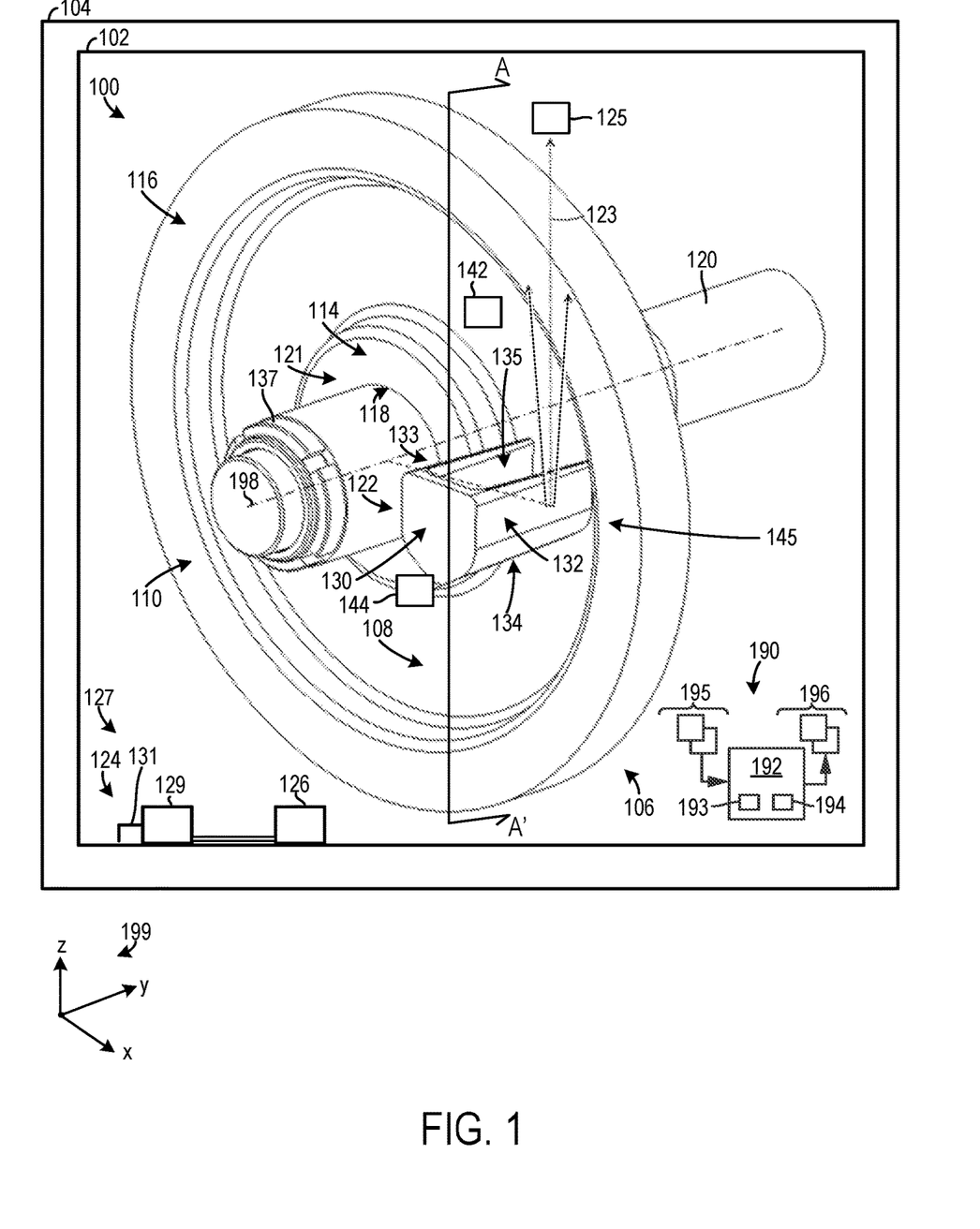
FIG. 1 shows a perspective view of a mechanical system with a lubrication assembly that includes a lubricant conveyor and rotating component.

FIG. 1 depicts a perspective view of a lubrication assembly 100. The lubricant used in the system may be an oil (e.g., a petroleum based oil, a non-petroleum based oil, combinations thereof, and the like). The lubrication assembly 100 is included in a mechanical system 102 such as a gearbox. In the gearbox example, the rotating component may be a gear. In such an example, the gear includes teeth that mesh with teeth in another gear. In other examples, the rotating component 106 may be a component such as a pulley, an impeller, a flywheel, and the like.

Continuing with the gearbox example, the mechanical system 102 may be included in a vehicle such as an electric vehicle (EV) 104. For instance, the EV 104 may be a battery electric vehicle (BEV), in one example, or a hybrid electric vehicle (HEV) that includes an internal combustion engine, in another example. The EV 104 may be a light, medium, or heavy-duty vehicle, for example. However, the lubrication assembly 100 may be used in a variety of mechanical systems such as any type of machine or equipment with a need for lubrication in fields such as industrial processing, the agricultural industry, the maritime industry, and the like.

The lubrication assembly 100 includes a rotating component 106. An axial recess 108 of the rotating component 106 is positioned on an axial side 110 thereof. Designing the rotating component 106 with the axial recess 108 allow the rotational mass of the rotating component to be decreased. Further, the axial recess 108 allows lubricant to achieve desired flow dynamics which are expanded upon herein with regard to FIGS. 2-6. The axial recess 108 of the rotating component 106 may be circumferentially bounded by an inner section 114 and an outer section 116 of the rotating component 106 that has a greater thickness than the axial recess 108. Additionally, the axial recess 108 may extend across one half to two thirds of the axial side of the rotating component, in one specific example, to achieve desired lubricant flow dynamics. However, the axial recess may have alternate sizes in other examples. Further, an opening 118 in the rotating component 106 may receive a shaft 120.

In one example, the lubrication assembly 100 may include a hub 121 that is coupled to the rotating component 106 on the shaft 120. Specifically, in an example, the rotating component may be keyed or otherwise fixedly coupled to the shaft 120. Therefore, the shaft and rotating component may rotate in unison. The hub 121 may therefore reside between the rotating component 106 and the shaft 120 and may be retained on the shaft via a locking collar 137 and/or other suitable mechanism. However, in other examples, the rotating component 106 may be rotatably coupled to the shaft 120.

The lubrication assembly 100 further includes a lubricant conveyor 122 that remains stationary relative to the rotating component 106. The conveyor may therefore be referred to as a static conveyor. The lubricant conveyor 122 may be mounted to a housing 144 or other suitable stationary component in the system such as static baffles, guards, and the like.

The conveyor 122 in conjunction with the windage generated by the rotating component 106 during system operation, generate a lubricant spray with a flow pattern (generally indicated via dashed arrows 123) that directs the lubricant to one or more targeted component(s) 125 in the mechanical system 102 which have lubrication needs. These components may include one or more gears (e.g., gear meshes), bearings, clutches, shafts, chains, combinations thereof, and the like. The lubricant spray at least partially travels in a tangential direction and allows for a more targeted lubricant distribution in the system when compared to splash lubrication systems which rely on gear teeth to imprecisely splash oil around the system. The flow pattern of the air and lubricant spray is expanded upon herein with regard to the description of FIGS. 4-5.

The lubrication assembly 100 may have a lubricant source 142 that is configured to deliver lubricant to the conveyor 122. In one example, the lubricant source may be constructed as ribs and/or baffles that collect and/or intercept the lubricant that flows towards the sump on the side walls of the transmission.

The lubrication assembly 100 and more generally the mechanical system 102 may include a dry sump 124 which is fluidly coupled to a reservoir 126 in a lubricant distribution system 127. In the lubricant distribution system 127, lubricant is pumped out of a sump 124 enclosure via a pump 129 with a pick-up 131. Positioning the rotating component 106 in the dry sump 124 allows the rotating component to be more efficiently operated when compared to splash lubrication systems which partially submerge the gears in oil.

The rotating component 106, the shaft 120, and the lubricant conveyor 122 may each be formed of one or more suitable materials such as one or more metals (e.g., steel, aluminum, and the like), plastic, and/or other non-metallic materials. The material(s) used for constructing the rotating component 106 may be selected based on the expected operating conditions in the system such as rotational speed, operating temperature, gear sizing, and the like.

Further, the lubricant conveyor 122 is positioned between the inner section 114 and the outer section 116 of the rotating component 106, in the illustrated embodiment. To elaborate, the lubricant conveyor 122 may be positioned adjacent to a lateral side 145 of the rotating component 106.

The lubricant conveyor 122 includes a front wall 130, two opposing side walls 133, 132, and a lower wall 134, in one example. In another example, the front wall may be formed in the housing 144. The lubricant conveyor 122 may be open on top and a lubricant flow channel 135 is formed in the opening. However, in other examples the lubricant conveyor 122 may be a closed channel (e.g., a pipe). In such an example, the lubricant supplied to the conveyor may be pressurized. In such an example, the conveyor may not be sloped downward, due to the pressurization of the lubricant which is capable of driving fluid flow in the channel. It will be understood, however, that the lubricant conveyor may be a closed channel and sloped downwards towards the rotating component, in certain embodiments.

The mechanical system 102 may include a control system 190 with a controller 192 as shown in FIG. 1. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 192 may receive various signals from sensors 195 coupled to various regions of the mechanical system 102. Upon receiving the signals from the various sensors 195 of FIG. 1, the controller 192 processes the received signals, and employs various actuators 196 of system components to adjust the components based on the received signals and instructions stored on the memory of controller 192. For example, the controller 192 may send a command to a component which drives rotation of an input of the system such as an electric motor. In response to the motor driving rotation of the system's input, the component 106 rotates due to the mechanical connection (e.g., via gear meshes, shafts, etc.) between the system's input and the component 106. The other controllable components in the system may function in a similar manner with regard to sensor signals, control commands, and actuator adjustment, for example.

Figure 2:
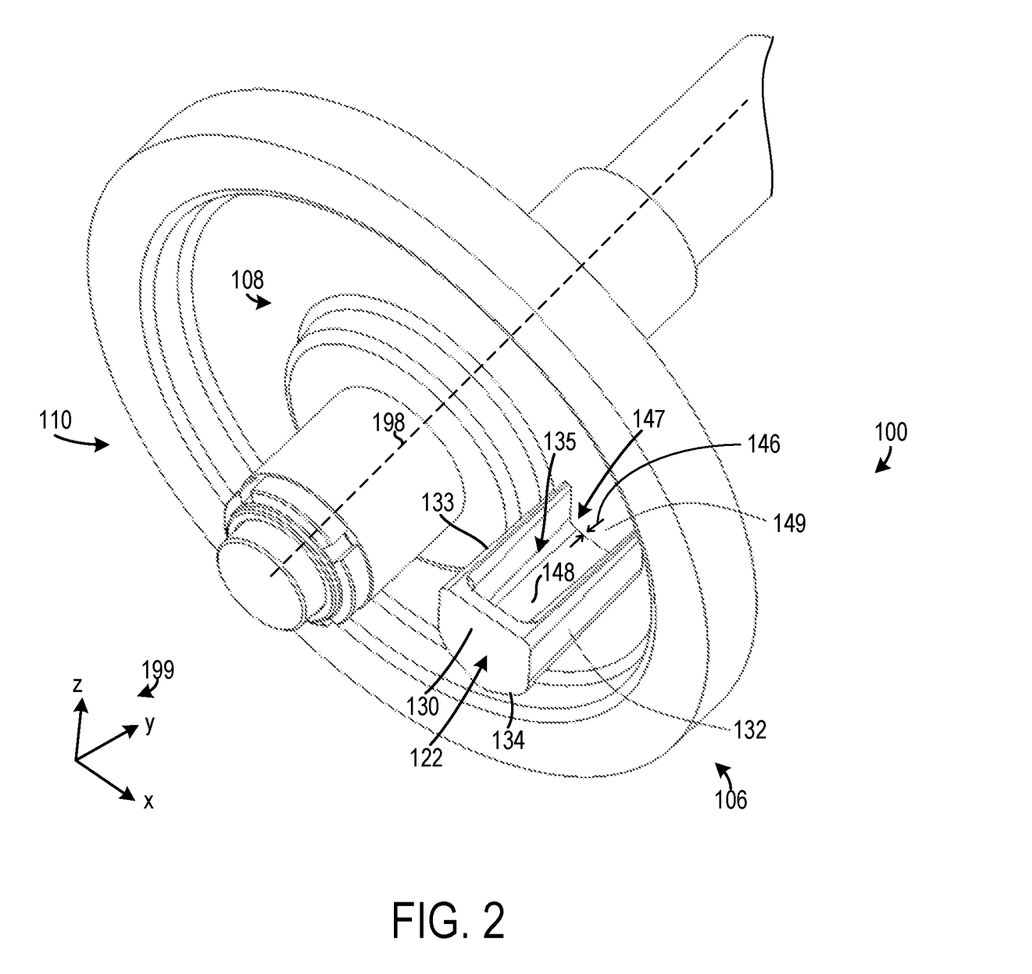
FIG. 2 depicts another perspective view of the lubrication assembly illustrated in FIG. 1.
Figure 3:
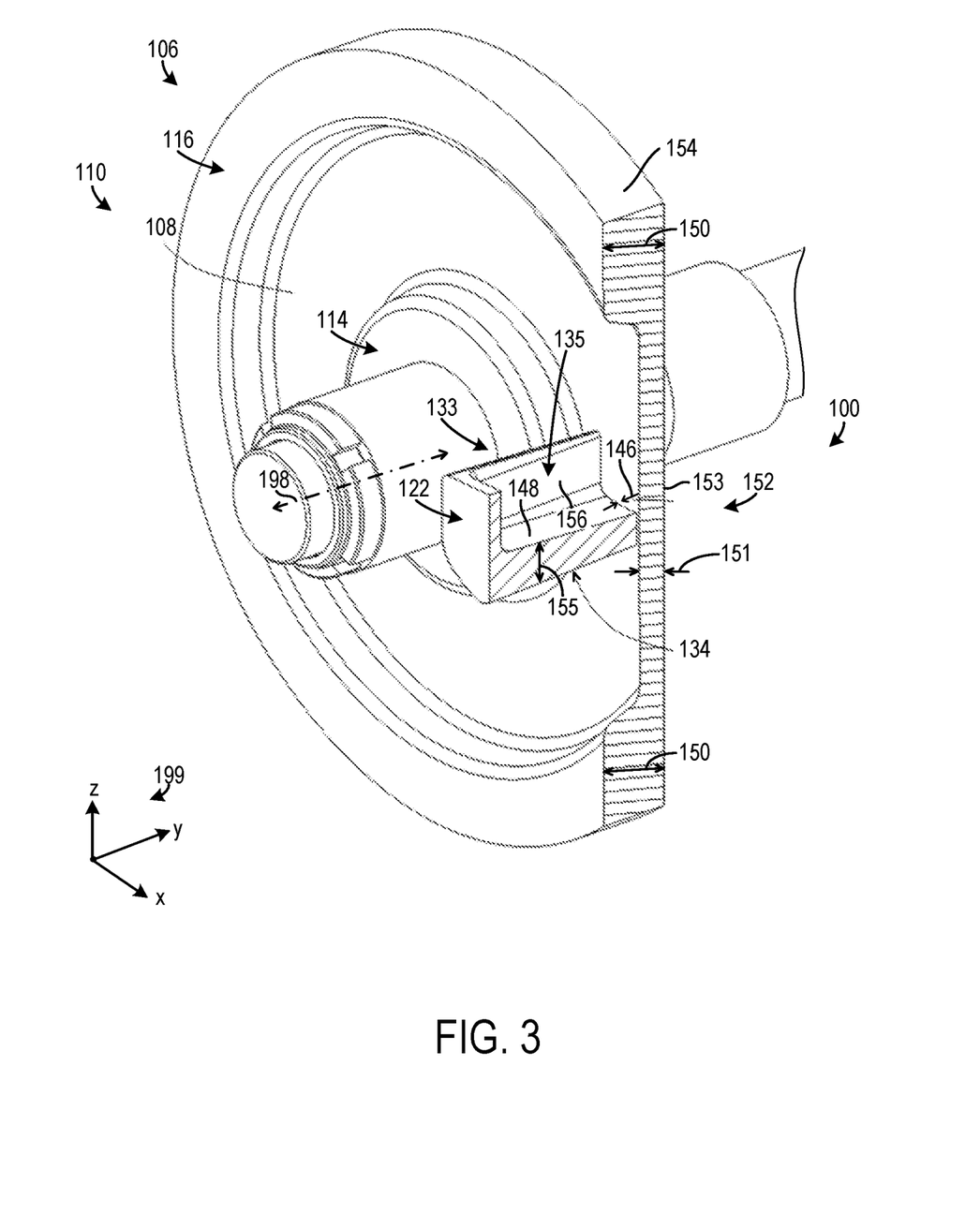
FIG. 3 depicts a cross-sectional view the lubricant conveyor and rotating component in the lubricant assembly, depicted in FIG. 2.
Figure 4:
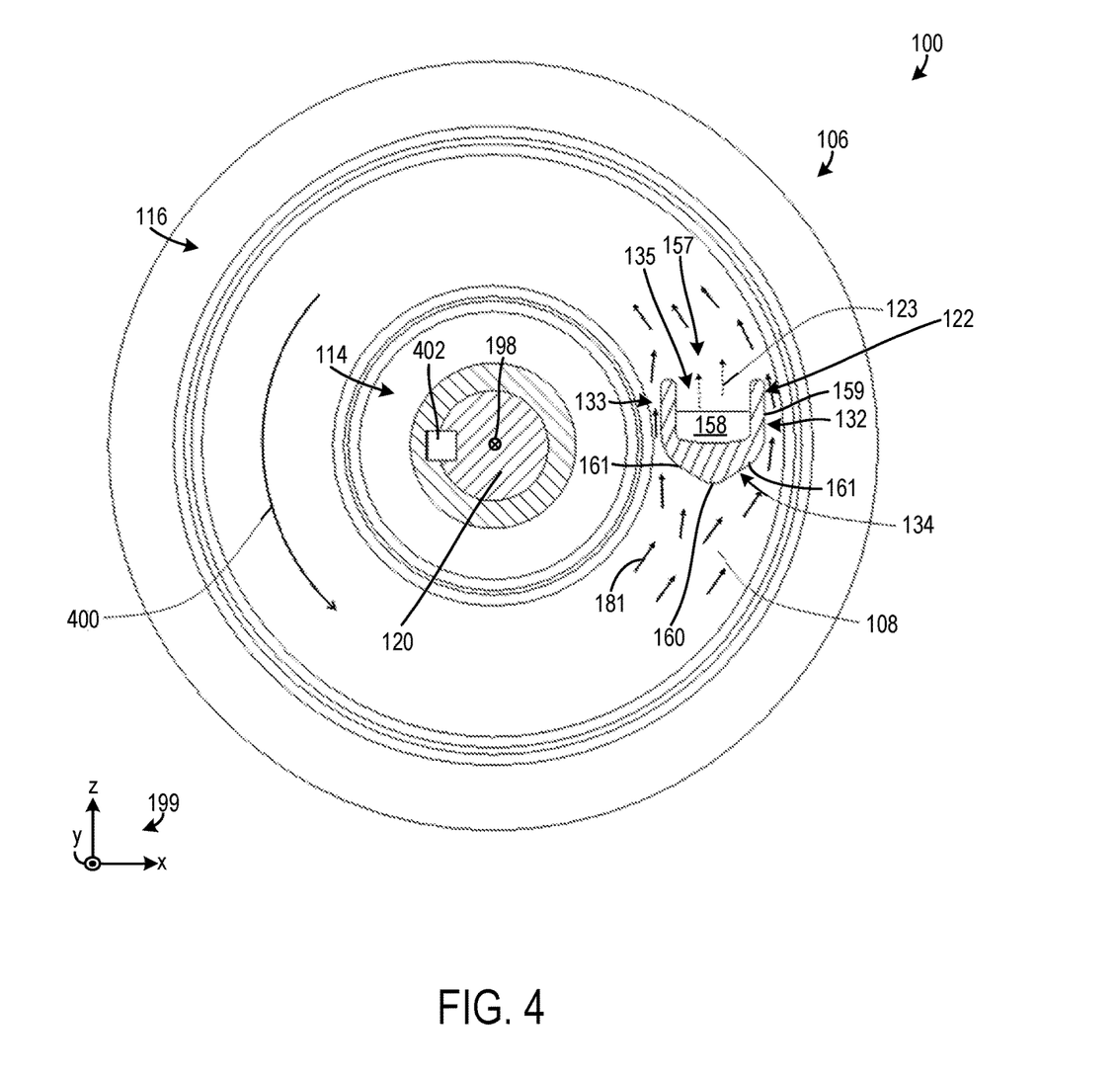
FIG. 4 depicts a frontal view of the rotating component and the lubricant conveyor, depicted in FIG. 2.
Figure 5:
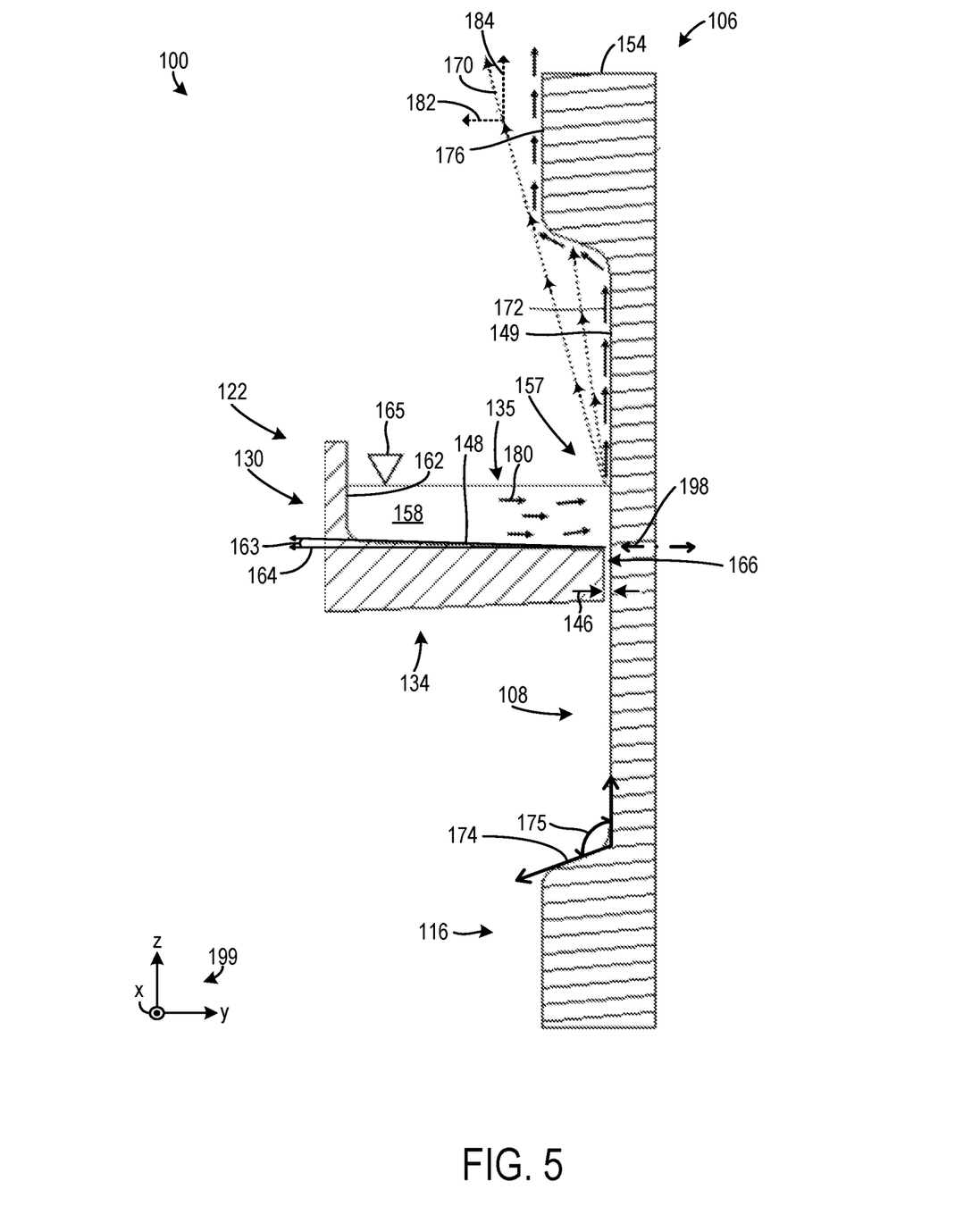
FIG. 5 depicts another cross-sectional view of the rotating component and the lubricant conveyor, depicted in FIG. 2.

An axis system 199 is provided in FIG. 1 as well as FIGS. 2-6, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Cutting plane A-A' for the cross-sectional views of FIGS. 3 and 5 is illustrated in FIG. 1. A rotational axis 198 of the rotating component 106 is further provided in FIGS. 1-6 for reference.

FIG. 2 depicts another perspective view of the lubrication assembly 100 with the lubricant conveyor 122 and the rotating component 106. As illustrated, the axial recess 108 in the rotating component 106 forms a continuous surface (e.g., planar surface) on the axial side 110, in the illustrated example. In other examples, the axial recess 108 may have a varied surface contour which may be profiled to generate an airflow pattern which alters the direction of lubricant flow.

A gap 146 between a surface 149 of the axial recess 108 and an inward end 147 of the lubricant conveyor 122 is depicted. The gap 146 may be relatively small such as ≤3 millimeters (mm). Specifically, in one example, the gap 146 may be ≤2 mm. Sizing the gap in these ranges allows the assembly to achieve a desired interaction between the component's windage and the lubricant in the conveyor to achieve an intended direction and droplet size that enhances lubrication in the system. Specifically, the interaction achieve via the aforementioned gap sizing allows components in the system to receive greater amounts of lubrication and cooling. Further, designing the gap in the abovementioned size range, enables the system's compactness to be increased. However, in other examples, the gap may have a size ≥3 mm. The size of the gap may be selected based on factors such as the type of lubricant used in the system, the component's expected rotating speed, the location of the components which receive the lubrication, and the like.

To passively flow lubricant toward the axial recess 108 along the lubricant conveyor 122, a lower surface 148 of the conveyor may be sloped downwards in relation to a horizontal axis that is perpendicular to a gravitational axis. However, in other examples, the lower surface may not be sloped. In such an example, the lubricant flow channel 135 may be at least partially closes and the amount of lubricant delivered to the conveyor may be based on the pressure of the lubricant provided to the flow channel.

Further, to contain the lubricant in the conveyor, the conveyor 122 has the two opposing side walls 132, 133, the front wall 130 that is spaced away from the gap 146, and the lower wall 134, as previously indicated. Further, as shown, a top of the conveyor is open and forms the open lubricant flow channel 135. However, other conveyor contours have been contemplated such as an at least partially closed lubricant flow channel. In such an example, the conveyor may include a top wall that extends between the side walls 132, 133.

FIG. 3 depicts another perspective view of the lubrication assembly 100 with the lubricant conveyor 122 and rotating component 106 in cross-section. In the illustrated example, the outer section 116 and the inner section 114 of the rotating component 106 have a greater thickness 150 than a thickness 151 of the axial recess 108. Further, the outer section 116 and inner section 114 of the rotating component 106 project axially outwards from the rotating component 106 on the axial side 110, resulting in the formation of the axial recess 108. On the opposing side 152 of the rotating component 106, a surface 153 which extends to the circumferential periphery 154 of the component is substantially planar, in the illustrated example. In other examples, the rotating component may have a varying thickness on the side 152. For instance, the outer section 116 of the rotating component 106 may be profiled to project axially outward on both axial sides of the rotating component 106 and the inner section 114 of the rotating component may also project axially outward on both sides. In such an example, the assembly may include another lubricant conveyor on the side 152 of the component, if desired.

The surface profile of the rotating component may be altered based on the number, geometry, and/or location of the lubricant conveyors used in the lubrication assembly, in alternate embodiments. For instance, the size of the axial recess may be increased when two conveyors are positioned with the recess, in one example, or the axial recess size may be decreased when a smaller conveyor is used in the assembly, in another example.

The lower wall 134 of the lubricant conveyor 122 may vary in thickness 155 along its length (from a front side to a rear side). The lubricant flow channel 135 which is bounded by the lower surface 148 and an inner surface 156 of the side wall 133 is further depicted. It will be appreciated that an inner surface of the side wall 132 also bounds the lubricant flow channel 135.

The lubricant flow channel 135 directs lubricant towards the gap 146. Further, the side wall 133 may taper in thickness from the front to rear of the lubricant conveyor 122. In this way, cross-sectional area of the flow channel (perpendicular to the direction of lubricant flow) may increase from the front side to the rear side of the channel. However, other channel contours have been contemplated, such as a flow channel which has a substantially constant cross-sectional area (perpendicular to the direction of lubricant flow) along its length or may decrease in cross sectional area from the front side to the rear side of the channel.

FIG. 4 depicts the rotating component 106, the shaft 120, and the lubricant conveyor 122 in the lubrication assembly 100. The axial recess 108, the inner section 114, and the outer section 116 of the rotating component 106 are again illustrated. Rotation of the component 106 in a counterclockwise direction is indicated via arrow 400.

The windage from the rotating component 106 drives the lubricant spray from the lubricant conveyor 122. The solid arrows 181 signify the general airflow pattern around the lubricant conveyor 122 during the counterclockwise rotation of the rotating component 106. Airflow occurs around the lower wall 134 and the lateral side walls 132, 133 of the lubricant conveyor 122. If the rotating component is configured to rotate in a clockwise direction, the lubricant conveyor may be positioned on the opposing side of the component to allow the windage to flow upwards around the lower wall of the conveyor. The lower wall 134 may have a leading surface 160 that has a swept shape. To elaborate, the leading surface 160 may include two sections 161 that are angled and merge at a curved tip. In this way, a desired airflow pattern may be generated that creates a targeted amount of low pressure above the lubricant flow channel, expanded upon herein.

The airflow, during certain operating conditions, exhibits turbulence that forms a wake 157 in a section above the lubricant flow channel 135 in which the lubricant 158 resides. The air in the wake 157 is at a lower pressure than the air below the conveyor, for instance, and consequently drives the lubricant spray 123, indicated via dashed arrows, during certain operating conditions. As such, the wake has a lower pressure region therein which induces lubricant droplet flow into the region in a generally tangential direction. The specifics of the lubricant flow pattern are elaborated upon herein with regard to FIG. 5. To achieve a desired airflow pattern around the lubricant conveyor 122 the sidewalls 132, 133 may have planar outer surfaces 159. However, sidewalls with other contours have been envisioned such as non-planar outer surfaces. FIG. 4 further shows a keyed interface 402 that may be formed between the shaft 120 and the rotating component.

FIG. 5 depicts a cross-section view of the lubrication assembly 100 that includes the rotating component 106 and the lubricant conveyor 122. The front wall 130, the lower wall 134, and the lubricant flow channel 135 of the lubricant conveyor 122 are again illustrated. The lubricant 158 contained within the flow channel 135 is further illustrated.

The lower surface 148 of the lubricant flow channel 135 is further depicted. A front surface 162 of the flow channel 135 may additionally bound the flow channel. The lower surface 148 forms an angle 163 in relation to a plane 164 that is parallel to the x-y plane. To expound, the lower surface 148 is angled downward from front to rear, to induce lubricant flow towards the recess 108 and specifically into the gap 146. In other words, the channel is sloped towards the recess. Arrows 180 indicate the general direction of lubricant flow in the channel. A level 165 of the lubricant 158 is also indicated in FIG. 5. The level of lubricant may be dictated by the lubricant source, discussed above with regard to FIG. 1.

FIG. 5 expands upon the previously described lubricant spray. As illustrated, the lubricant leaving the flow channel 135 follows two general flow paths. The amount of lubricant which follows each flow path may be dictated by the speed of the rotating component. A first flow lubricant flow path is indicated via dashed arrows 170, while a second lubricant flow path is indicated via solid arrows 172. The first lubricant flow path may occur when the rotating component is rotating at a higher speed and the second lubricant flow path may occur when the rotating component is rotating at a lower speed. However, it will be understood that the first and second flow paths may concurrently occur, during certain operating conditions.

At lower rotating component speeds, the lubricant from the flow channel 135 flows away from an inboard side 166 of the lubricant conveyor 122 towards the axial recess 108 and adheres to the surface 149 of the recess. After adhering to the axial recess, the lubricant travels tangentially outward toward the outer section 116. The lubricant traveling along the surface of the rotating component surface then reaches an angled surface 174 of the outer section 116. An angle 175 between the surface 174 and the surface 149 is specifically depicted in FIG. 5. The angle may be between 95° and 179°, in one example, to achieve desired lubricant flow dynamics. However, the angle 175 may be outside the aforementioned range, in other examples. Some of the lubricant may continue to adhere to a surface 176 of the outer section 116 as indicated via the solid arrows 172. However, due to the angled surface, some of the lubricant may leave the surface as droplets and travel in a direction with both an axial and a tangential component. On the other hand, the lubricant that remains on the surface 176 reaches the periphery 154 of the rotating component and is projected in a tangential direction toward targeted components which have lubrication needs.

When the rotating component 106 rotates at higher speeds, at least a portion of the lubricant exiting the lubricant flow channel 135 in the form of droplets (as indicated via the dashed arrows 170) due to the interaction between the windage and the lubricant conveyor 122. To elaborate, the lubricant is sucked away from the lubricant conveyor 122 into the lower pressure region formed in the wake 157 of the conveyor in the form of droplets. These lubricant droplets have both an axial component 182 and a tangential component 184 of their velocity. In this way, the droplets may be directed in a desired direction towards one or more targeted components. As a result, the lubricant may be more precisely directed towards the lubricated component(s) thereby increasing system efficiency when compared to splash lubrication systems.

In both the first and second lubricant flow patterns, the lubricant accelerated within an angular range around the velocity of the moving surface. Further, it will be understood that both of the first and second flow patterns may be generated within certain rotational velocity ranges of the rotating component 106. As the component's speed increases the proportion of the lubricant exhibiting the first flow pattern increases and the proportion of the lubricant exhibiting the second flow pattern decreases and vice versa.

Figure 6:
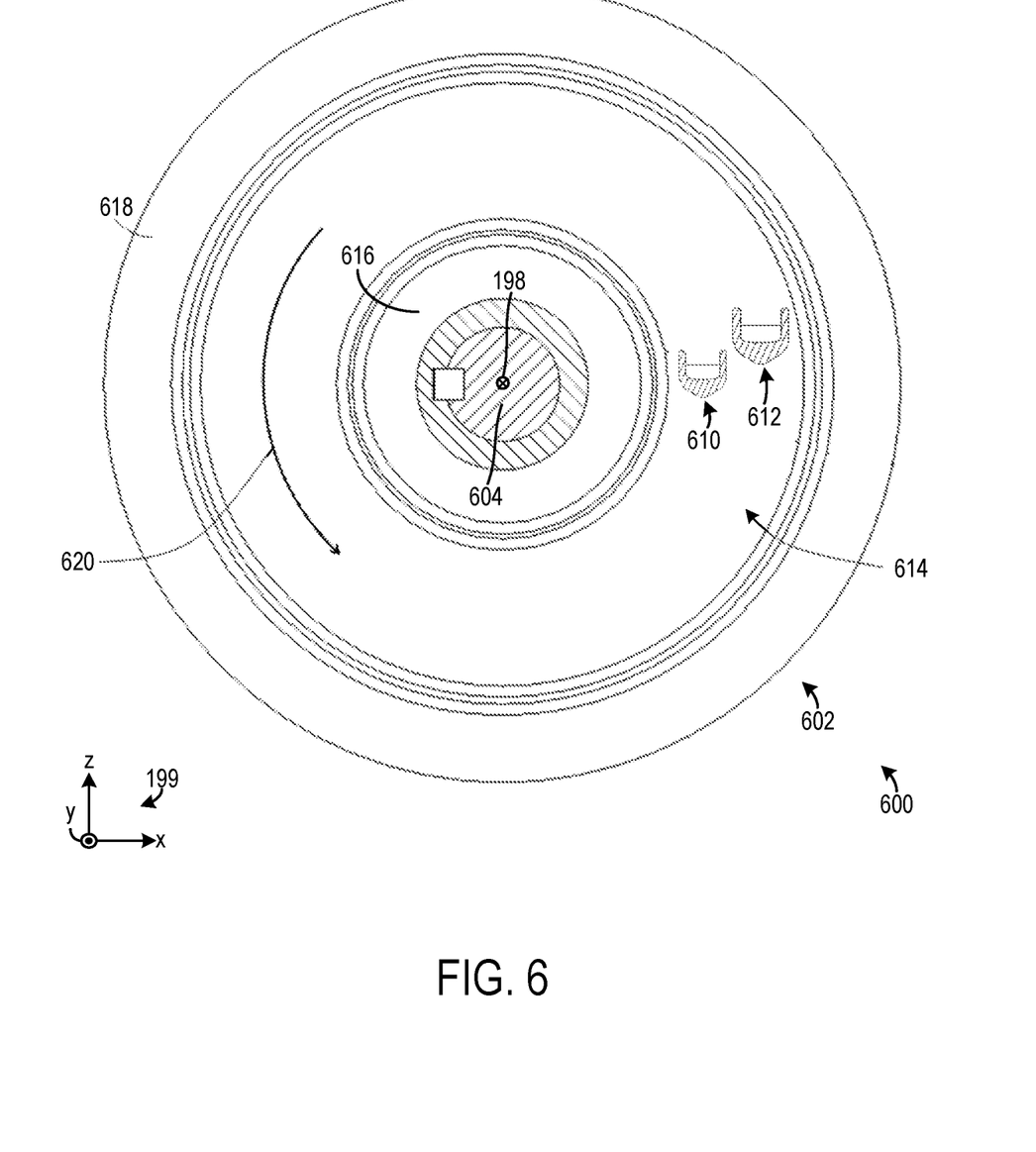
FIG. 6 depicts another example of a lubrication assembly with a rotating component and multiple lubricant conveyors.

FIG. 6 depicts another example of a lubrication assembly 600 that again includes a rotating component 602 on a shaft 604. As illustrated, the lubrication assembly 600 includes multiple lubricant conveyors (a first lubricant conveyor 610 and a second lubricant conveyor 612). The first and second lubricant conveyors 610, 612 are again stationary and extend into an axial recess 614 of the rotating component 602 which is positioned between an inner section 616 and an outer section 618. In the illustrated example, the lubricant conveyors have a varying sizes. To elaborate, as illustrated, the second lubricant conveyor 612 is larger than the first lubricant conveyor 610. Consequently, the lubricant may be more precisely directed towards multiple components with different lubrication needs (for instance) when the component rotates in the direction 620. In this way, the system may be adapted for different operating environments with different lubrication demands. In other examples, the lubricant conveyors may have equivalent sizes or the first conveyor may be larger than the second conveyor. Still further in other examples, the lubricant conveyor may be positioned on opposing sides of the rotating component with regard to the y-axis. Moreover, to lubricate the targeted component, two conveyors may be used on the same side or opposing sides of the rotating component in different positions if the rotating component is capable of rotating in both rotational directions.

FIGS. 1-6 provide for a method for operation of a lubrication system. The method includes rotating a rotating component with an axial recess that is arranged on an axial side of the rotating component to generate windage which drives a lubricant spray that is focused in a targeted direction. To induce the rotation of the rotating component, a motor or an internal combustion engine may transfer mechanical power to an input of the system (e.g., transmission).

The technical effect of the lubrication assembly operating methods described herein is to efficiently distribute lubricant to desired components in a more precise manner than previous splash lubrication systems and reduce (e.g., avoid) churning losses experienced by the rotating component.

FIGS. 1-6 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another.

As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such.

The invention will be further described in the following paragraphs. In one aspect, a lubrication assembly is provided that comprises a rotating component including an axial recess positioned on an axial side of the rotating component; and a first lubricant conveyor that remains stationary relative to the rotating component, extends into the axial recess to form a gap between a surface of the axial recess and an end of the first lubricant conveyor, and directs a lubricant toward the axial recess during rotation to generate a lubricant spray; wherein the first lubricant conveyor is offset from an axis of rotation of the rotating component.

In another aspect, a method for operation of a lubrication system is provided that comprises rotating a rotating component with an axial recess that is arranged on an axial side of the rotating component to generate windage which drives a lubricant spray that is focused in a targeted direction; wherein the lubrication system includes a static lubricant conveyor that extends into the axial recess and provides a lubricant source for the lubricant spray; and wherein the static lubricant conveyor is offset from an axis of rotation of the rotating component.

In another aspect, a lubrication assembly is provided that comprises a rotating component including an axial recess positioned on an axial side of the rotating component; and a lubricant conveyor that is coupled to a stationary component, extends into the axial recess to form a gap between a surface of the axial recess and an end of the lubricant conveyor, and directs a lubricant toward the axial recess during gearbox operation to generate a lubricant spray that includes droplets that adhere to the surface of the axial recess and/or are in a lower pressure region near the surface; wherein the lubricant conveyor is offset from an axis of rotation of the rotating component.

In any of the aspects or combinations of the aspects, the lubricant spray may be focused in a targeted direction and may have a tangential velocity component.

In any of the aspects or combinations of the aspects, the lubricant spray may have an axial velocity component.

In any of the aspects or combinations of the aspects, a lower surface of the first lubricant conveyor may be sloped towards the axial recess.

In any of the aspects or combinations of the aspects, the first lubricant conveyor may include two opposing side walls and an end wall that may be spaced away from the gap.

In any of the aspects or combinations of the aspects, the axial recess may extend across the axis of rotation of the rotating component.

In any of the aspects or combinations of the aspects, the rotating component may be included in a gearbox that has a dry sump positioned below the rotating component.

In any of the aspects or combinations of the aspects, the rotating component is a gear.

In any of the aspects or combinations of the aspects, the gap may be less than three millimeters.

In any of the aspects or combinations of the aspects, the axial recess may extend across one half to two thirds of the axial side of the rotating component.

In any of the aspects or combinations of the aspects, the lubrication assembly may further include a second lubricant conveyor that extends into the axial recess and may be offset from the axis of rotation.

In any of the aspects or combinations of the aspects, the lower pressure region may be in a wake of the lubricant conveyor.

In any of the aspects or combinations of the aspects, the lubricant conveyor may include a lower surface sloped downwards towards the axial recess, two opposing side walls and an end wall that is spaced away from the gap.

In any of the aspects or combinations of the aspects, the gap may be less than or equal to two millimeters.

In any of the aspects or combinations of the aspects, the lubrication assembly may further comprise a dry sump positioned below the rotating component.

In any of the aspects or combinations of the aspects, the lubricant may be oil.

In any of the aspects or combinations of the aspects, the first lubricant conveyor may be positioned between an inner section and an outer section of the rotating component that has a greater thickness than the axial recess.

In another representation, a lubrication arrangement in a gearbox is provided that comprises a gear which generates windage during operation and a stationary oil conveyor that extends into a reduced thickness section of the gear and passively flows oil towards the reduced thickness section to generate an oil spray flow pattern which directs the oil tangentially towards one or more lubricated components.

Note that the example control and estimation routines included herein can be used with various mechanical system configurations. The control methods and routines disclosed herein may be stored as executable instructions in non-transitory memory and may be carried out by the control system including the controller in combination with the various sensors, actuators, and other system in combination with the electronic controller. As such, the described actions, operations, and/or functions may graphically represent code to be programmed into the non-transitory memory of the computer-readable storage medium in the control system. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to mechanical systems in which lubrication is desired such as geartrains which may be driven by different sources such as electric machines, internal combustion engines, and the like. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A lubrication assembly, comprising:
a rotating component including an axial recess positioned on an axial side of the rotating component; and
a first lubricant conveyor that remains stationary relative to the rotating component, extends into the axial recess to form a gap between a surface of the axial recess and an end of the first lubricant conveyor, and directs a lubricant toward the axial recess during rotation to generate a lubricant spray;
wherein the first lubricant conveyor is offset from an axis of rotation of the rotating component; and
wherein the rotating component is included in a gearbox that has a dry sump positioned below the rotating component;
a pump including a pick-up positioned within the dry sump;
wherein the first lubricant conveyor includes two opposing side walls and a front wall that is spaced away from the gap;
wherein the rotating component includes an inner section and an outer section;
wherein an angled surface extends between the inner section and the outer section; and
wherein the entirety of the side walls and the front wall are positioned radially inward from the outer section of the rotating component.

2. The lubrication assembly of claim 1, wherein a portion of the lubricant spray has a tangential velocity component.

3. The lubrication assembly of claim 2, wherein a portion of the lubricant spray has an axial velocity component.

4. The lubrication assembly of claim 1, wherein the lubricant spray travels radially outward beyond a periphery of the rotating component.

5. The lubrication assembly of claim 1, wherein a lower wall of the first lubricant conveyor has a leading surface that includes two sections which are angled in relation to one another.

6. The lubrication assembly of claim 1, wherein the rotating component is a flywheel or a pulley.

7. The lubrication assembly of claim 1, wherein the gap is less than three millimeters.

8. The lubrication assembly of claim 1, wherein the axial recess extends across one half to two thirds of the axial side of the rotating component.

9. The lubrication assembly of claim 1, further comprising a second lubricant conveyor that extends into the axial recess and is offset from the axis of rotation.

10. A method for operation of a lubrication system, comprising:
rotating a rotating component with an axial recess that is arranged on an axial side of the rotating component to generate windage which drives a lubricant spray that is focused in a targeted direction;
wherein the lubrication system includes a static lubricant conveyor that extends into the axial recess and provides a lubricant source for the lubricant spray; and
wherein the static lubricant conveyor is offset from an axis of rotation of the rotating component;
wherein the rotating component is included in a gearbox that has a dry sump positioned below the rotating component;
wherein the lubrication system includes a pump with a pick-up that is positioned within the dry sump;
wherein the first lubricant conveyor includes two opposing side walls and a front wall that is spaced away from the gap;
wherein the rotating component includes an inner section and an outer section;
wherein an angled surface extends between the inner section and the outer section; and
wherein the entirety of the side walls and the front wall are positioned radially inward from the outer section of the rotating component.

11. The method of claim 10, wherein the lubricant spray has a tangential velocity component.

12. The method of claim 11, wherein the lubricant spray has an axial velocity component.

13. A lubrication assembly, comprising:
a rotating component including an axial recess positioned on an axial side of the rotating component;
a lubricant conveyor that is coupled to a stationary component, extends into the axial recess to form a gap between a surface of the axial recess and an end of the lubricant conveyor, and directs a lubricant toward the axial recess during gearbox operation to generate a lubricant spray that includes droplets that adhere to the surface of the axial recess and/or are in a lower pressure region near the surface;
wherein the lubricant conveyor is offset from an axis of rotation of the rotating component; and
wherein the rotating component is included in a gearbox that has a dry sump positioned below the rotating component; and
a pump including a pick-up positioned within the dry sump;
wherein the first lubricant conveyor includes two opposing side walls and a front wall that is spaced away from the gap;
wherein the rotating component includes an inner section and an outer section;
wherein an angled surface extends between the inner section and the outer section; and
wherein the entirety of the side walls and the front wall are positioned radially inward from the outer section of the rotating component.

14. The lubrication assembly of claim 13, wherein the lower pressure region is in a wake of the lubricant conveyor.

15. The lubrication assembly of claim 13, wherein the lubricant conveyor includes:
a lower surface sloped downwards towards the axial recess.

16. The lubrication assembly of claim 15, wherein the gap is less than or equal to two millimeters.

17. The lubrication assembly of claim 13, wherein the lubricant is oil.

\* \* \* \* \*